United States Patent [19]

Burba et al.

[11] Patent Number: 5,106,443
[45] Date of Patent: Apr. 21, 1992

[54] PROCESS FOR THE MANUFACTURE OF PIPE FROM COMPOSITE MATERIALS BASED ON EPOXY RESINS AND 1,7-BIS-(1-(2'-AMINOETHYL)-1,3-DIAZA-2-CYCLOPENTEN-2-YL)HEPTANE

[75] Inventors: Christian Burba, Herbern; Herbert Franz, Hamm; Alwin Krotzek, Werne; Werner Mrotzek, Dortmund, all of Fed. Rep. of Germany

[73] Assignee: Schering AG, Bergkamen, Fed. Rep. of Germany

[21] Appl. No.: 686,304

[22] Filed: Apr. 16, 1991

Related U.S. Application Data

[63] Continuation of Ser. No. 446,640, Dec. 6, 1989, abandoned.

[30] Foreign Application Priority Data

Dec. 27, 1988 [DE] Fed. Rep. of Germany ....... 3843985

[51] Int. Cl.$^5$ .......................................... B65H 81/00
[52] U.S. Cl. .................................... 156/175; 156/173; 156/169; 156/330
[58] Field of Search ............... 156/173, 175, 169, 330; 528/117

[56] References Cited

U.S. PATENT DOCUMENTS 2,843,153 7/1958 Young ............................ 156/175 X
2,878,234 3/1959 Peterson .

FOREIGN PATENT DOCUMENTS 1216330 4/1960 France .

OTHER PUBLICATIONS

Yoshikazu Nakano, "Aqueous Dispersion of Curable Resin", Patent Abstracts of Japan, Feb. 6, 1981, vol. 5 No. 20 (C-42) (692).

*Primary Examiner*—Jeff H. Aftergut
*Attorney, Agent, or Firm*—Curtis, Morris & Safford

[57] ABSTRACT

The invention relates to a process for the manufacture of pipe from composite materials for industrial and drinking water, produced by the filament-winding method from epoxy resins and 1,7-bis-[1-(2'-aminoethyl)-1,3-diaza-2-cyclopenten-2-yl]-heptane and/or 1,8-bis-[1-(2'-aminoethyl)-1,3-diaza-2-cyclopenten-2-yl]octane as curing agents and commonly used reinforcing materials.

5 Claims, 2 Drawing Sheets

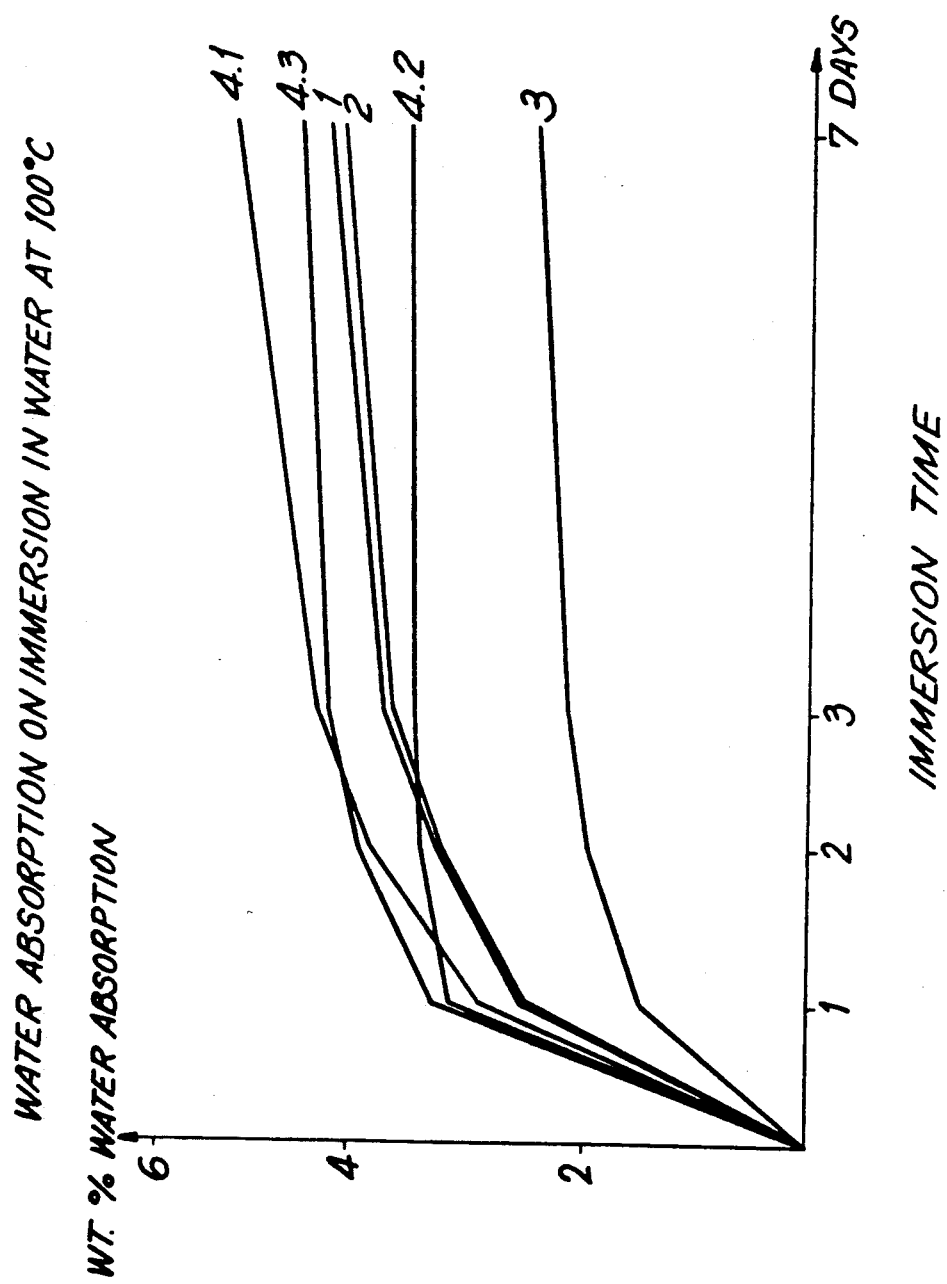

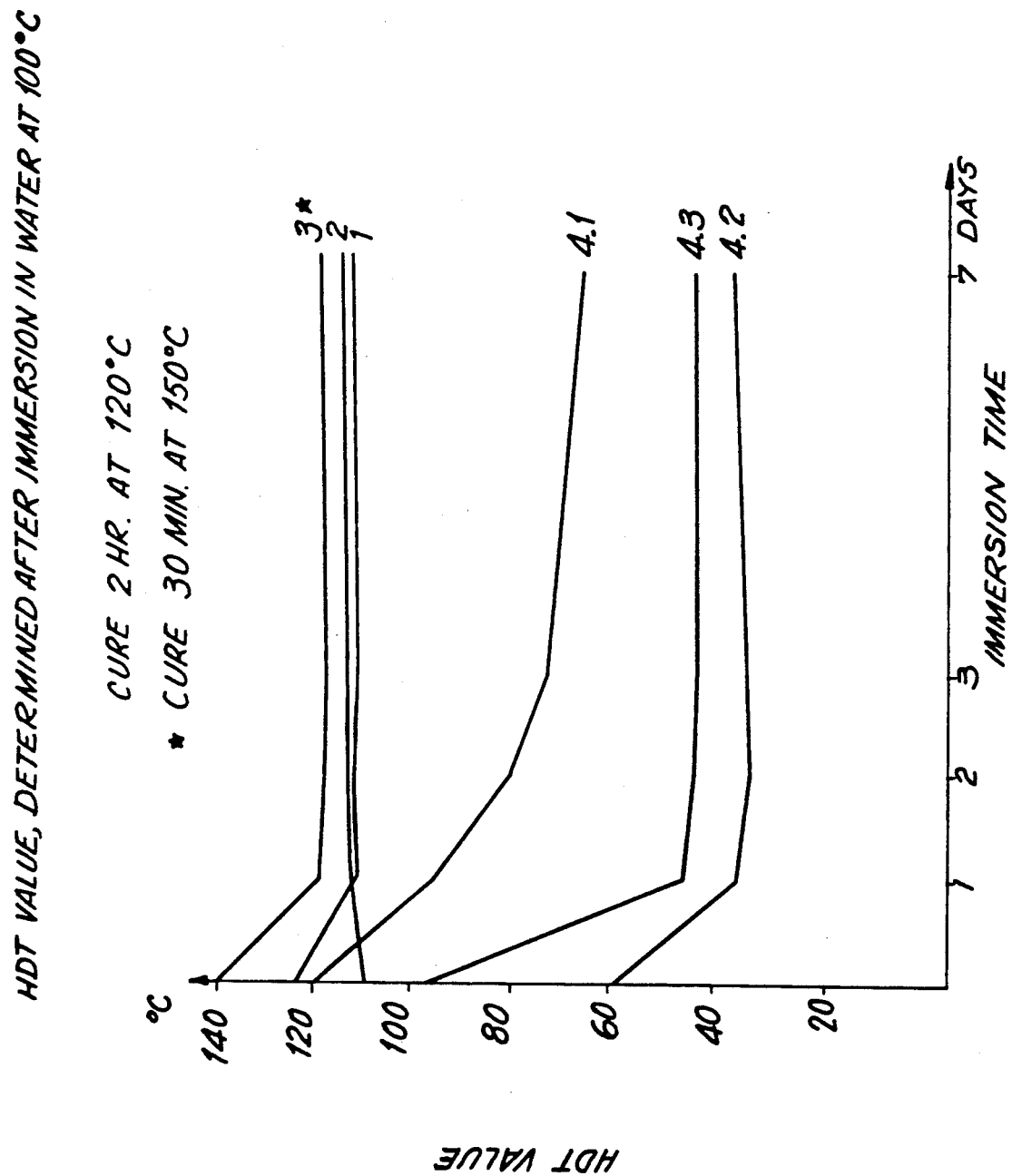

PROCESS FOR THE MANUFACTURE OF PIPE FROM COMPOSITE MATERIALS BASED ON EPOXY RESINS AND 1,7-BIS-(1-(2'-AMINOETHYL)-1,3-DIAZA-2-CYCLO-PENTEN-2-YL)HEPTANE

This application is a continuation of application Ser. No. 446,640, filed Dec. 6, 1989, now abandoned.

The invention relates to a process for the manufacture of pipe from composite materials for industrial and drinking water, produced by the filament-winding method from commonly used reinforcing materials with binders based on epoxy resins and 1,7-bis-[1-(2'-aminoethyl)-1,3-diaza-2-cyclopenten-2-yl]heptane and/or 1,8-bis-[1-(2'-aminoethyl)-1,3-diaza-2-cyclopenten-2-yl]octane.

The metal pipes which today still predominate are afflicted with a number of drawbacks so far as their properties are concerned, and particularly high weight and corrodibility. Every year enormous amounts of money must be expended for the maintenance, repair or replacement of water-carrying pipes in the low-temperature range (drinking water and water for industrial use), especially where hot water or steam has to be supplied or discharged.

This is why a concerted effort has been under way for some time to utilize in this field the favorable properties of fiber-reinforced resins, such as low weight, good resistance to chemicals and in some cases to solvents, adaptability with respect to constructional requirements, economy of manufacture as compared with other corrosion-resistant materials of construction, such as glass, metal or porcelain enamel, low maintenance and repair costs.

The efforts to utilize the favorable properties of fiber-reinforced resins also for pipe to be used to convey drinking and industrial water at higher temperatures have therefore been intensified.

It was then found that apart from a few processing problems it has been particularly the doubtful physiological safety of the curing agents commonly employed in the filament-winding sector that have militated against the commercial use of such pipe to carry potable water.

In the conveying of hot water or steam of up to 120° C., a lowering of the level of thermal properties, as determined, for example, by the torsion pendulum test in conformity with DIN 53,445, has been observed even after a relatively short time.

This lowering of the level of thermal properties has in some cases so adverse an effect on the structural properties of fiber-reinforced composites that they cannot be employed in the aforesaid applications.

Of the great many available curing agents, only 1-amino-3,3,5-trimethyl-5-aminomethylcyclohexane (isophorone diamine) has so far proved to possess the requisite physical properties.

However, isophorone diamine is a relatively expensive curing agent. Besides, it is not always available in sufficient quantities and also has a few processing drawbacks. These include, in particular, a short processing time, a high curing temperature, and physiological problems.

Many attempts have therefore been made in the past to develop alternative curing agents which result in properties in the cured resins that are comparable to those produced by isophorone diamine but give rise to fewer physiological problems.

While the imidazolines based on reaction products of monomeric fatty acids having from 2 to 18 carbon atoms, and more particularly from 2 to 5 carbon atoms, which have been proposed up to now have proved physiologically safe, they are not sufficiently resistant to hot water, as evidenced by the pronounced drop in the heat-distortion temperature (HDT) after immersion in boiling water.

Empirical values have shown that not only the imidazolines from short-chain monocarboxylic acids but, surprisingly, also the imidazolines from the hydrophobic long-chain monomeric and dimeric fatty acids are capable of absorbing rather large amounts of water, with a corresponding drop in the HDT values. This has not been the case with cycloaliphatic diamines such as isophorone diamine. (See FIGS. 1 and 2.)

It has therefore been generally held that imidazolines are unsuited for use as curing agents for epoxy resins when the end products are to be subjected to loading with water.

Surprisingly, it has now been found that 1,7-bis-[1-(2'-aminoethyl)-1,3-diaza-2-cyclopenten-2-yl]heptane and 1,8-bis-[1-(2'-aminoethyl)-1,3-diaza-2-cyclopenten-2-yl]octane impart to cured epoxy resins based on bisphenol A and bisphenol F both physiological safety and resistance to long-time exposure to hot water or superheated steam of up to 120° C. In addition, they improve the processing properties and, in particular, extend the pot life to practical lengths of time.

Thus, one embodiment of the invention is a process for the manufacture of pipe from composite materials for industrial and drinking water, produced by the filament-winding method with binders based on epoxy resins which on the average contain more than one epoxy group per molecule, and curing agents for the epoxy resins, along with commonly used auxiliary and additive substances, which is characterized in that the binders used consist of curable mixtures composed of (A) at least one liquid epoxy resin having epoxy values of from 0.4 to 0.6;

(B) 1,7-bis-[1-(2'-aminoethyl)-1,3-diaza-2-cyclopenten-2-yl]heptane and/or 1,8-bis-[1-(2'-aminoethyl)-1,3-diaza-2-cyclopenten-2-yl]octane; and optionally (C) commonly used fillers and/or stiffeners, pigments, dyes, accelerators, wetting and flow-control agents, and reactive diluents.

A further embodiment of the invention is a process characterized in that bisphenol A and/or bisphenol F having epoxy values of between 0.5 and 0.55 is or are used as liquid epoxy resin according to (A).

The epoxy resins used in accordance with the invention are glycidyl ethers with two or more epoxy groups per molecule, and preferably glycidyl ethers based on mono- or polyhyiric phenols. In accordance with the invention, glycidyl ethers of 2,2-bis(4-hydroxyphenyl)-propane (bisphenol A) having epoxy values of from 0.2 to 0.6, and particularly the compounds which have epoxy values of from 0.45 to 0.55 and are liquid at room temperature, are preferred. The glycidyl ethers based on bisphenol F and the novolacs have also proved advantageous.

1,7-Bis-[1-(2'-aminoethyl)-1,3-diaza-2-cyclopenten-2-yl]heptane and/or 1,8-bis-[1-(2'-aminoethyl)-1,3-diaza-2-cyclopenten-2-yl]octane are prepared by reacting azelaic acid or sebacic acid, respectively, with diethylenetriamine in a molar ratio of at least 1:2. As a rule, they are used in amounts of from 10 to 20 parts by weight, and preferably 15 parts by weight, per 100 parts by weight of epoxy resin.

To modify the processing and curing properties, the generally known modifiers commonly employed in this field, such as customary fillers and/or stiffeners, pigments, dyes, accelerators, wetting and flow-control agents, reactive diluents, and curing agents may also be used, if desired. As reinforcements, the comonly used glass fibers are preferably employed.

Cycloaliphatic amines in particular, for example, isophorone diamine, 1,2-diaminocyclohexane or 4,4'-diamino-3,3'-dimethyldicyclohexylmethane, are preferably used as customary curing agents.

Among the glycidyl ethers which in accordance with the invention are also used, those based on alicyclic alcohols, such as 1,4-dimethylolcyclohexane, and aliphatic alcohols, especially dihydric or trihydric alcohols having from 4 to 8 carbon atoms, such as butanediols, hexanediols, octanediols or glycerol, which may be lengthened by the addition of ethylene oxide or propylene oxide, are preferred.

The amount of the reactive diluents usually ranges from 5 to 10, and preferably from 6 to 8, percent by weight, based on the epoxy resin according to (A).

BRIEF DESCRIPTION OF THE DRAWINGS

FIG. 1 is a graph showing the relationship between water absorption and time of epoxy resin having different curing agents.

FIG. 2 is a graph showing the relationship between heat distortion temperature and time of epoxy resin having different curing agents.

DESCRIPTION OF THE PROCESS

Because of the relatively long Tecam gel time of the curing agents which in accordance with the invention are also used, the pot lives can be adjusted as required by the judicious addition of accelerators commonly used in this field.

For example, tertiary amines such as those based on phenol-formaldehyde condensation products may be used as accelerators.

The relatively high viscosities of the curing agents which in accordance with the invention are also used make it possible to adapt also the processing viscosity individually to actual requirements. When heatable impregnating baths and winding mandrels are employed, this can be done simply by appropriate selection of the temperature, and with other, nonheatable mandrels, by the use of reactive diluents. This permits continuous adjustment, which makes possible optimum wetting of the reinforcing material without the binder being squeezed out and dripping down during the winding operation, that is, as the filament-wound structure is being built up. Apart from a reduction of binder losses, the build-up of the filament-wound structure will then proceed more uniformly.

In the manufacture of pipe by the filament-winding method, continuous fibers provided with binder are continuously wound onto a rotating mandrel which determines the inside diameter of the pipe. The pipe wall is built up in layers, the impregnated fibers being first laid down one next to the other over the entire length of the pipe, as in the case of a spool, before the next layer is wound on top of it in the same manner. The thickness of the winding and the winding angle perpendicular to the pipe axis depend on the later internal pressure of the pipe; however, fabricating considerations require that every layer be at a slightly different winding angle from the next. After the desired pipe-wall thickness has been reached, the filament-wound structure is subjected to a heat treatment along with the mandrel to cure the still liquid binder, following which the structure is stripped from the mandrel.

In the manufacture of high-quality pipe by the filament-winding method, it is important that the reinforcing fibers be wetted by the binder as completely as possible without, however, the binder dripping down from the structure being wound because of insufficient impregnating viscosity. Moreover, the resin system should have a sufficiently long gel time so that a completed layer is not fully reacted before the next layer has been laid down, which would entail a detrimental weakening of the entire filament-wound structure. Besides, a short gel time of the resin system renders the whole manufacturing operation more difficult as it precludes the use of easily handled impregnating baths for the deposition of the binder on the reinforcing fibers and makes it necessary to resort instead to continuous proportioning of the binder, which considerably increases the likelihood of faulty proportioning and mixing. Now since the filament-wound structure on completion should fully react as rapidly as possible under the action of heat, the gel time should be optimally adjustable to the duration of a given winding operation.

As is apparent from Table 1, the gel time (expressed in the Tecam value) of the binder system with the curing agent of Example 1 is significantly higher than the comparative value of the binder system with the curing agent of Example 3, which at present is used preferentially in the pipe-winding sector. The tensile-test values and the level of properties under thermal stresses of Example 1 are also considerably better than the data of Example 3 when curing is carried out under the preferred conditions of 2 hours at 120° C. This is well illustrated by the high transition temperature of Example 1. (184° C. as against 158° C.)

Of particular significance in this connection is the change in the level of properties of the binder system with uniform temperature and media exposure, as shown in Table 2, based on the change in HDT values after immersion in boiling water for different lengths of time.

As exemplified by Table 2 with respect to Example 4.1, after exposure for just seven days to heat and water the HDT value of most of the binder systems cured with imidazolines and subjected to such loading drops to one-half of the initial value in some cases. In contrast thereto, in the case of the imidazolines of Examples 1 and 2, used concurrently in accordance with the invention, there is only a minor drop in the heat-distortion temperature after immersion in boiling water.

EXAMPLE 1

24.72 kg of diethylenetriamine and 0.24 kg of paratoluenesulfonic acid monohydrate are introduced as initial charge and heated to 50° C. 22.56 kg of azelaic acid is then added in portions with vigorous stirring so that a homogeneous mixture is obtained.

On completion of this addition, the temperature is raised. Condensation sets in at about 160° C. The temperature is gradually increased to 240° C. and maintained at that level until no further distillate passes over. Vacuum is then gradually applied up to about 600 millibars, care being taken to prevent unreacted diethylenetriamine from distilling off.

The reaction mixture is held at 240° C. and about 600 millibars until the calculated amount of condensate is reached and the imidazoline content exceeds 80%, as determined by infrared spectroscopy.

The filtered product has the following characteristics:

| Amine value: | 550–590 |
|---|---|
| Viscosity: | 5–15 Pa · s/25° C. |
| Imidazoline content: | 80% |

EXAMPLE 2

206 g (2 mols) of diethylenetriamine and 2 g of para-toluenesulfonic acid are introduced as initial charge and heated to 50° C. 202 g (1 mol) of sebacic acid is then added in portions with vigorous stirring so that a homogeneous mixture is obtained.

On completion of this addition, the temperature is raised. Condensation sets in at about 160° C. The temperature is gradually increased to 240° C. and maintained at that level until no further distillate passes over. Vacuum is then gradually applied up to about 120 millibars, care being taken to prevent unreacted diethylenetriamine from distilling off.

The reaction mixture is held at 240° C. and 120 millibars until the imidazoline content is about 80%, as determined by infrared spectroscopy.

The filtered product has the following characteristics:

| Amine value: | 430 |
|---|---|
| Viscosity: | 67.7 Pa · s/25° C. |
| Imidazoline content: | 79% |

EXAMPLE 3

Commercial isophorone diamine.

| Amine value: | 660 |
|---|---|
| Viscosity: | 15 mPa · s/25° C. |

EXAMPLE 4

Same as Example 1, except that in place of azelaic acid an equivalent amount of propionic acid (4.1), tall oil fatty acid (4.2), and dimeric fatty acid (dimeric proportion, 96%) (4.3), respectively, is used. The product has the following characteristics:

| 4.1 | Amine value: | 700 |
|---|---|---|
| | Viscosity: | 20 mPa · s/25° C. |
| | Imidazoline content: | 80% |
| 4.2 | Amine value: | 260 |
| | Viscosity: | 200 mPa · s/25° C. |
| | Imidazoline content: | 91% |
| 4.3 | Amine value: | 300 |
| | Viscosity: | 5000 mPa · s/25° C. |
| | Imidazoline content: | 91% |

Test procedure

For determination of the level of mechanical properties, 15 parts by weight, in the case of Examples 1,2 and 4, and 25 parts by weight, in the case of Example 3, of curing agent were mixed with 100 parts by weight of a low-viscosity epoxy resin based on bisphenol A (epoxy value, 0.54) and cured in a steel mold for 2 hours at 120° C. to give flat molded parts 4 m thick. From these parts, test specimens were then cut by sawing or milling, and on these the property values given in Table 1 which follows were determined in keeping with the respective test specifications.

The dimensions of the test specimens used in the various tests were as follows:

Three-point flexural test: $80 \times 10 \times 4$ mm$^3$

Tensile test: Gage length No. 3 in conformity with DIN 53,455

Heat-distortion test: $120 \times 10 \times 4$ mm$^3$

TABLE 1

Properties of various binder systems after curing for 2 hours at 120° C.

| Property | Unit | Example 1 | Example 2 | Example 3 | Example 4.1 |
|---|---|---|---|---|---|
| Tecam gel time for 250 g at 23° C. | Minute | 270 | 400 | 115 | 400 |
| Flexural strength (DIN 53,452) | N/mm$^2$ | 104 | 88 | 102 | 110 |
| Tensile strength (DIN 53,455) | N/mm$^2$ | 63.5 | 62.2 | 45.3 | 75 |
| Elongation (DIN 53,455) | % | 3.3 | 2.7 | 1.9 | 3.5 |
| Heat-distortion temperature (DIN 53,461) | °C. | 126 | 120 | 123 | 120 |
| Transition temperature (DIN 53,445) | °C. | 184 | 159 | 158 | 145 |

TABLE 2

HDT values of various binder systems after immersion in boiling water

| | Immersion time in boiling water | | | | |
|---|---|---|---|---|---|
| | 0 value | 1 day | 2 days | 3 days | 7 days |
| Example 1 | 126 | 115 | 115 | 115 | 115 |
| Example 2 | 113 | 114 | 113 | 113 | 113 |
| Example 3 | 123 | 118 | 118 | 117 | 117 |
| Example 4.1 | 120 | 99 | 84 | 77 | 70 |

We claim:

1. A process for the manufacture of pipe from composite materials for industrial and drinking water, having a relatively consistent heat-distortion temperature over a period of time when exposed to water having an elevated temperature, which comprises filament-winding at a processing temperature with (i) a binder based on epoxy resins which on the average contain more than one epoxy group per molecule, (ii) a curing agent for the epoxy resins, and (iii) auxiliary and additive substances, wherein the binder is a curable mixture containing at least one liquid epoxy resin having an epoxy value of from 0.4 to 0.6; and the curing agent is selected from the group consisting of 1,7-bis-[1-(2'-aminoethyl)-1,3-diaza-2-cyclopenten-2-yl]heptane and 1,8-bis-[1-(2'-aminoethyl)-1,3-diaza-2-cyclopenten-2-yl]octane or mixtures thereof.

2. A process as defined in claim 1, wherein the auxiliary and additive substances are selected from the group consisting of a filler, dye, accelerator, wetting agent, flow-control agent, reactive diluent and mixtures thereof.

3. A process as defined in claim 1, wherein the liquid epoxy resin is selected from the group consisting of bisphenol A, bisphenol F and mixtures thereof having an epoxy value of between 0.5 and 0.55.

4. A process as defined in claim 1, wherein the binder is liquid at the processing temperature.

5. A process as defined in claim 2, wherein the auxiliary and additive substances include a reactive diluent which is a glycidyl ether based on aliphatic or alicyclic polyols having from 4 to 8 carbon atoms.

* * * * *